(12) United States Patent
Xiong et al.

(10) Patent No.: US 11,578,721 B2
(45) Date of Patent: Feb. 14, 2023

(54) OIL-FREE SCROLL AIR COMPRESSOR WITH DOUBLE PARALLEL GROOVES ON BOTH SIDES

(71) Applicant: Zhejiang University, Zhejiang (CN)

(72) Inventors: Shusheng Xiong, Zhejiang (CN); Xinchen Weng, Zhejiang (CN); Renpu Jiang, Zhejiang (CN); Jianbing Shu, Zhejiang (CN); Huaxing Hong, Zhejiang (CN)

(73) Assignee: Zhejiang University, Hangzhou (CN)

( * ) Notice: Subject to any disclaimer, the term of this patent is extended or adjusted under 35 U.S.C. 154(b) by 107 days.

(21) Appl. No.: 17/160,348

(22) Filed: Jan. 27, 2021

(65) Prior Publication Data

US 2021/0148360 A1 May 20, 2021

Related U.S. Application Data

(63) Continuation of application No. PCT/CN2019/124710, filed on Dec. 12, 2019.

(30) Foreign Application Priority Data

May 23, 2019 (CN) .......................... 201910434248.1

(51) Int. Cl.
*F04C 18/02* (2006.01)
*F04C 29/00* (2006.01)
*F04C 29/04* (2006.01)

(52) U.S. Cl.
CPC ...... *F04C 18/0223* (2013.01); *F04C 18/0269* (2013.01); *F04C 29/0057* (2013.01);
(Continued)

(58) Field of Classification Search
CPC .............. F04C 18/0223; F04C 18/0269; F04C 29/0057; F04C 29/04; F04C 29/042
See application file for complete search history.

(56) References Cited

U.S. PATENT DOCUMENTS

| 5,098,265 A | * | 3/1992 | Machida | ................. | F01C 17/06 418/55.6 |
| 5,322,426 A | * | 6/1994 | Kolb | ..................... | F01C 1/0246 418/60 |

(Continued)

FOREIGN PATENT DOCUMENTS

| CN | 1138669 A | 12/1996 |
| CN | 1208819 A | 2/1999 |

(Continued)

OTHER PUBLICATIONS

International search report of PCT Patent Application No. PCT/CN2019/124710 dated Mar. 18, 2020.

*Primary Examiner* — Mark A Laurenzi
*Assistant Examiner* — Xiaoting Hu

(57) ABSTRACT

An oil-free scroll air compressor, includes two fixed scrolls and a movable scroll with scroll wraps on both sides. The fixed scrolls each are provided on an end surface thereof with scroll wraps. The movable scroll with scroll wraps on both sides is provided on both end surfaces thereof with scroll wraps. The two fixed scrolls and the movable scroll with scroll wraps on both sides together form two gas compression channels located on two sides. The scroll warps on a same end surface are configured as a double-parallel-groove structure, which further divides the gas compression channel on the same side into two gas compression channels, thereby increasing displacement of the scroll air compressor. After a gas is introduced through a gas inlet on a circumferential surface of the fixed scroll, the gas is compressed in multiple compression channels and then discharged from a center of the scroll air compressor.

11 Claims, 6 Drawing Sheets

(52) U.S. Cl.
CPC .......... *F04C 29/04* (2013.01); *F04C 2240/50* (2013.01); *F04C 2240/60* (2013.01)

(56) References Cited

U.S. PATENT DOCUMENTS

| | | | | |
|---|---|---|---|---|
| 5,755,564 | A | * | 5/1998 | Machida ............. F04C 18/0223 418/101 |
| 6,149,405 | A | * | 11/2000 | Abe ...................... F04C 23/008 418/94 |
| 2009/0123315 | A1 | * | 5/2009 | Nakamura .......... F04C 29/0057 418/83 |
| 2009/0229582 | A1 | * | 9/2009 | Sakuyama ............... B62M 7/06 123/559.1 |
| 2010/0080722 | A1 | * | 4/2010 | Muroi ................... F04C 29/023 418/55.1 |
| 2019/0338779 | A1 | * | 11/2019 | Shaffer ................. F01C 1/0223 |

FOREIGN PATENT DOCUMENTS

| | | | | |
|---|---|---|---|---|
| CN | 1450268 | A | | 10/2003 |
| CN | 1570389 | A | | 1/2005 |
| CN | 103032329 | A | * | 4/2013 .......... F04C 18/0215 |
| CN | 107620704 | A | | 1/2018 |
| DE | 3839252 | A1 | * | 5/1990 |
| DE | 4205541 | A1 | * | 8/1993 .......... F04C 18/0223 |
| JP | H05157076 | A | * | 6/1993 |

\* cited by examiner

OIL-FREE SCROLL AIR COMPRESSOR WITH DOUBLE PARALLEL GROOVES ON BOTH SIDES

CROSS REFERENCE TO RELATED APPLICATIONS

The present application is a Continuation Application of PCT Application No. PCT/CN2019/124710 filed on Dec. 12, 2019, which claims the benefit of Chinese Patent Application No. 201910434248.1 filed on May 23, 2019. All the above are hereby incorporated by reference. the contents of which are incorporated herein by reference in their entirety.

FIELD OF THE INVENTION

The present disclosure relates to the field of compressors, and in particular, to a large-displacement low-compression-ratio oil-free scroll air compressor with double parallel grooves on both sides.

BACKGROUND OF THE INVENTION

With the increasing severity of atmospheric pollution and the shortage of traditional fossil energy, traditional fossil fuel vehicles are being gradually replaced by new energy vehicles. With the support of national policies, the new energy vehicle industry represented by electric vehicles has risen rapidly. However, due to the technical bottlenecks in battery performance, safety, and cruising range of electric vehicles, new energy vehicles powered by hydrogen fuel cells and characterized by high efficiency, low noise, and low emissions have attracted much attention.

As a national key industry, hydrogen fuel cell vehicles have always been a hot area of research by related scholars in recent years. A hydrogen fuel cell system, as a power source of a fuel cell vehicle, consists of a fuel cell stack, a fuel supply and circulation system, an oxidant supply system, a water/heat management system, and a control system that coordinates operations of various systems. The oxidant supply system is one of the most important auxiliary devices in the hydrogen fuel cell, and its design and performance of the hydrogen fuel cell system are closely related. The oxidant supply system of the hydrogen fuel cell needs to meet requirements of large displacement and low compression ratio. Therefore, there is an urgent need in engineering practice for a large-displacement, low-compression-ratio, and long-service-life compressor to be used as an important part of the oxidant supply system.

Scroll air compressors are common gas compressors. Scroll air compressors have features that just meet the requirement of low compression ratio for an oxidant supply system, and they have been widely used in various engineering projects. A commonly used scroll air compressor mainly includes a fixed scroll and a movable scroll. The movable scroll, when driven by a power source, is capable of a circular translational movement around an axis of the fixed scroll to reduce a volume of each compression chamber in a gas compression channel through physical compression, by way of which a gas in the gas compression channel is compressed and finally discharged from a center. However, the commonly used scroll air compressors are often provided with compression only in one single stage, and therefore their displacement is small, which can hardly meet the requirements of hydrogen fuel cells.

Chinese patent CN107620704A proposes a mechanical and electrical integrated dual-side oil-free scroll compressor. In this patent, a movable scroll is provided on both end surfaces thereof with scroll wraps. The movable scroll is simultaneously coupled with two fixed scrolls for compression work. Compared with a commonly used single-stage scroll air compressor, the scroll air compressor in this patent increases an amount of a gas compressed per unit time, which helps to reduce the volume of large-displacement scroll air compressors. However, this patent has the following disadvantages.

1. The scroll air compressor is too simple to meet the requirements of the engineering field with complex working conditions.

2. A motor is directly mounted on a working portion. During operation of the scroll air compressor, the motor may be damaged by impacts from the movable scroll.

3. The displacement of the scroll air compressor can hardly be further increased.

SUMMARY OF THE INVENTION

The technical problem to be solved by the present disclosure is that existing scroll air compressors have a small displacement, which can hardly meet complex and diverse engineering requirements.

The present disclosure provides an oil-free scroll air compressor with double parallel grooves on both sides, which can effectively increase a displacement of a scroll air compressor while maintaining a stable operation condition and a relatively long service life.

In order to solve the above technical problem, the present disclosure provides the following technical solutions.

An oil-free scroll air compressor with double parallel grooves on both sides mainly includes: a casing; a motor, which is fixedly connected in the casing; a rotating shaft, which is movably connected in the casing and is driven by the motor. The oil-free scroll air compressor further includes two fixed scrolls, which are a fixed scroll I on an end away from the casing, and a fixed scroll II on an end close to the casing and fixedly connected to the casing. The fixed scroll I and the fixed scroll II are fixedly connected to each other in a sealed way on outer circumferences thereof. The fixed scroll I is provided on the outer circumference thereof with at least two gas inlets evenly arranged along a circumferential direction, and the fixed scroll I and the fixed scroll II are in communication with each other at a position close to a connecting surface therebetween. The fixed scroll I is provided on an end surface thereof facing the fixed scroll II with scroll wraps I, and the fixed scroll II is provided on an end surface thereof facing the scroll wraps I with scroll wraps II. The scroll wraps I and the scroll wraps II have a same size. A movable scroll with scroll wraps on both sides is connected between the fixed scroll I and the fixed scroll II. The movable scroll with scroll wraps on both sides is provided at both end surfaces thereof with scroll wraps III, the scroll wraps III being adapted to the scroll wraps I and the scroll wraps II respectively. The scroll wraps I, the scroll wraps II, and the scroll wraps III are configured as double-parallel-groove structures which are specifically as follows. The scroll wraps on each of the end surfaces include two scroll wraps. The two scroll wraps are configured to simultaneously extend, from two respective positions close to a center of the end surface and centrally symmetrical with respect to the center of the end surface, to an outer circumference of the end surface, in a clockwise or counterclockwise direction and in shapes of swirls. The scroll wraps I and the scroll wraps III mesh with each other to form a gas compression channel I, and the scroll wraps II and the scroll wraps III mesh with each other to form a gas compression channel II. The double-parallel-groove structure divides the gas compression channel I into gas compression channels Ia and gas compression channels Ib arranged at intervals, and the double-parallel-groove structure divides the gas compression channel II into gas compression channels IIa and gas compression channels IIb. The movable scroll with scroll wraps on both sides is provided at a position close to a center thereof with an exhaust communication hole I communicating the gas compression channel I with the gas compression channel II, and the fixed scroll I is provided with at a central position thereof with a gas outlet passage communicating an outside with the gas compression channel I. The fixed scroll II is provided at a central position thereof with a rotating shaft avoiding hole. The rotating shaft includes an eccentric section having an axis deviated from an axis of the rotating shaft. The movable scroll with scroll wraps on both sides is provided at a central position of a side thereof facing the fixed scroll II with a rotating shaft mounting hole. The eccentric section passes through the rotating shaft avoiding hole and is fixedly connected in the rotating shaft mounting hole, and the eccentric section drives the movable scroll with scroll wraps on both sides to make a circular translational movement around the axis of the rotating shaft. Eccentric positioning mechanisms are provided between the movable scroll with scroll wraps on both sides and the fixed scroll I, and between the movable scroll with scroll wraps on both sides and the fixed scroll II.

An advantage of such a design is that in the scroll air compressor, a movable scroll with scroll wraps on both sides that is provided with scroll wraps on both sides thereof is used, and further the scroll wraps on respective ones of the fixed scrolls and the movable scroll with scroll wraps on both sides are divided into two wraps, by way of which a gas compression channel on the same side is divided into two gas compression channels. This increases the displacement of the scroll air compressor while maintaining volumes of the movable scroll with scroll wraps on both sides and the fixed scrolls unchanged. The eccentric positioning mechanisms can ensure a determined range of movement of the movable scroll with scroll wraps on both sides. The movable scroll with scroll wraps on both sides always performs a circular translational motion along the axis of the rotating shaft within a preset range, to ensure that air-tightness is achieved among different compression spaces in the gas compression channels to avoid effects on the compression effect of the scroll air compressor due to backflow of compressed gases.

Preferably, the fixed scroll I and the fixed scroll II are provided on end surfaces thereof facing away from the movable scroll with scroll wraps on both sides with cooling mechanisms, the cooling mechanisms being a cooling water chamber I corresponding to the fixed scroll I and a cooling water chamber II corresponding to the fixed scroll II. The cooling water chamber I includes a water tank I fixedly connected to the fixed scroll I, a water inlet passage I in communication with the water tank I, and a water tank cover plate I covered and mounted on the water tank I. The cooling water chamber II is provided, in a same way as in the case of the cooling water chamber I, with a water inlet passage II, a water tank II, and a water tank cover plate II.

Preferably, the gas outlet passage includes a gas outlet passage inlet in a same shape as the exhaust communication hole I. The gas outlet passage inlet is provided therein with a reinforcing rib for enhancing strength of the gas outlet passage inlet.

Preferably, the scroll air compressor is made of an aluminum alloy.

Preferably, the motor is a variable frequency motor.

Preferably, an end of the casing away from the fixed scroll II is connected in a sealed manner with a detachable end cover; an end of the rotating shaft is fixedly connected to the end cover through a rotating bearing I, and another end of the rotating shaft is connected to the fixed scroll II through a rotating bearing II; and the eccentric section is fixedly connected to the rotating shaft mounting hole through a movable scroll bearing.

Preferably, the rotating shaft is provided thereon with at least two counter weights extending outward from the rotating shaft, which are a counter weight I on an end away from the eccentric section and a counter weight II on an end close to the eccentric section. An extension direction of the counter weight I and an extension direction of the counter weight II differ by 180° relative to the axis of the rotating shaft. The scroll air compressor is provided therein with a cavity for accommodating the counter weight I and the counter weight II.

Preferably, the eccentric positioning mechanisms include crankshafts having same eccentricities as an eccentricity of the eccentric section, and the movable scroll with scroll wraps on both sides, the fixed scroll I, and the fixed scroll II are all provided thereon with crankshaft mounting holes adapted to the crankshafts.

Further, the crankshaft mounting holes include: at least two crankshaft mounting holes I evenly distributed along an outer circumferential surface of the movable scroll with scroll wraps on both sides; crankshaft mounting holes III provided on an outer circumferential surface of the fixed scroll II and corresponding to the crankshaft mounting holes I; a crankshaft mounting hole II provided at a central position of an end surface of the movable scroll with scroll wraps on both sides facing away from the shaft mounting hole; and a crankshaft mounting hole IV provided on the fixed scroll I and corresponding to the crankshaft mounting hole II. The crankshafts include crankshafts I and a crankshaft II. The crankshafts I are fixedly connected between the crankshaft mounting holes I and the crankshaft mounting holes III, and the crankshaft II is fixedly connected between the crankshaft mounting hole II and the crankshaft mounting hole IV.

Further, rotating bearings are provided between the crankshafts and the crankshaft mounting holes.

In general, the present disclosure has the following advantages over the existing technologies.

1. The present disclosure, without changing the shape and the volume of the scroll air compressor, effectively increases the displacement of the scroll air compressor, so that the scroll air compressor can be more suitable for use in a working environment of large displacement.

2. The principle and design of the cooling system are very simple. The cooling system has good performance, and can be directly checked and repaired by opening the water tank cover plate, which is convenient to use.

3. Providing the gas outlet passage inlet and the exhaust communication hole I in correspondence is helpful to avoiding a large difference in shapes between the gas outlet passage inlet and the exhaust communication hole I which can lead to the problem that the gas outlet passage affects an aerodynamic parameter of the high-pressure gas to be discharged. Because high-pressure gases are mixed and then together flow through the gas outlet passage inlet, a flow rate and a pressure of the high-pressure gases are relatively large. In order to protect the gas outlet passage inlet from deformation due to the impact of a large load, a reinforcing rib is provided in the gas outlet passage to protect the gas outlet passage inlet.

4. Aluminum alloy can meet the requirements for overall structural strength of the scroll air compressor, and its cost is low. The variable frequency motor allows the scroll air compressor to adapt to compression requirements under different working conditions, and a user can automatically adjust the displacement of the scroll air compressor as needed, which helps to increase diversity of use scenarios of the scroll air compressor. The rotating bearings can limit the rotating shaft and prevent the rotating shaft from swinging or being severely worn. The counter weights can offset an inertia force and a moment of inertia generated during rotation of the rotating shaft, which can increase the working performance and service life of the rotating shaft.

5. The eccentricities of the crankshafts are the same as the eccentricity of the eccentric section, which ensures that the movable scroll with scroll wraps on both sides always performs a circular translational movement along the axis of the rotating shaft without any deviation. Multiple crankshafts are used to together limit the movement of the movable scroll with scroll wraps on both sides, and can effectively share a force from the rotating inertia force of the movable scroll with scroll wraps on both sides exerted on the rotating shaft, by way of which the service life of the scroll air compressor can be improved. Providing multiple crankshafts in different positions to together limit the movement of the movable scroll with scroll wraps on both sides improves the movement stability of the movable scroll with scroll wraps on both sides, which helps to improve the overall working stability of the scroll air compressor. Further, the rotating bearings III also help to reduce frictions generated during operation of the crankshafts to increase the service life of the crankshafts. Meanwhile, because the rotating shaft in this design does not penetrate the movable scroll with scroll wraps on both sides, this design can realize a better sealing effect and a better dynamic balance performance.

6. The compression principle of the oil-free scroll air compressor with double parallel grooves on both sides is simple. The compressor has a small overall size, and is convenient to design and use.

Figure 1:
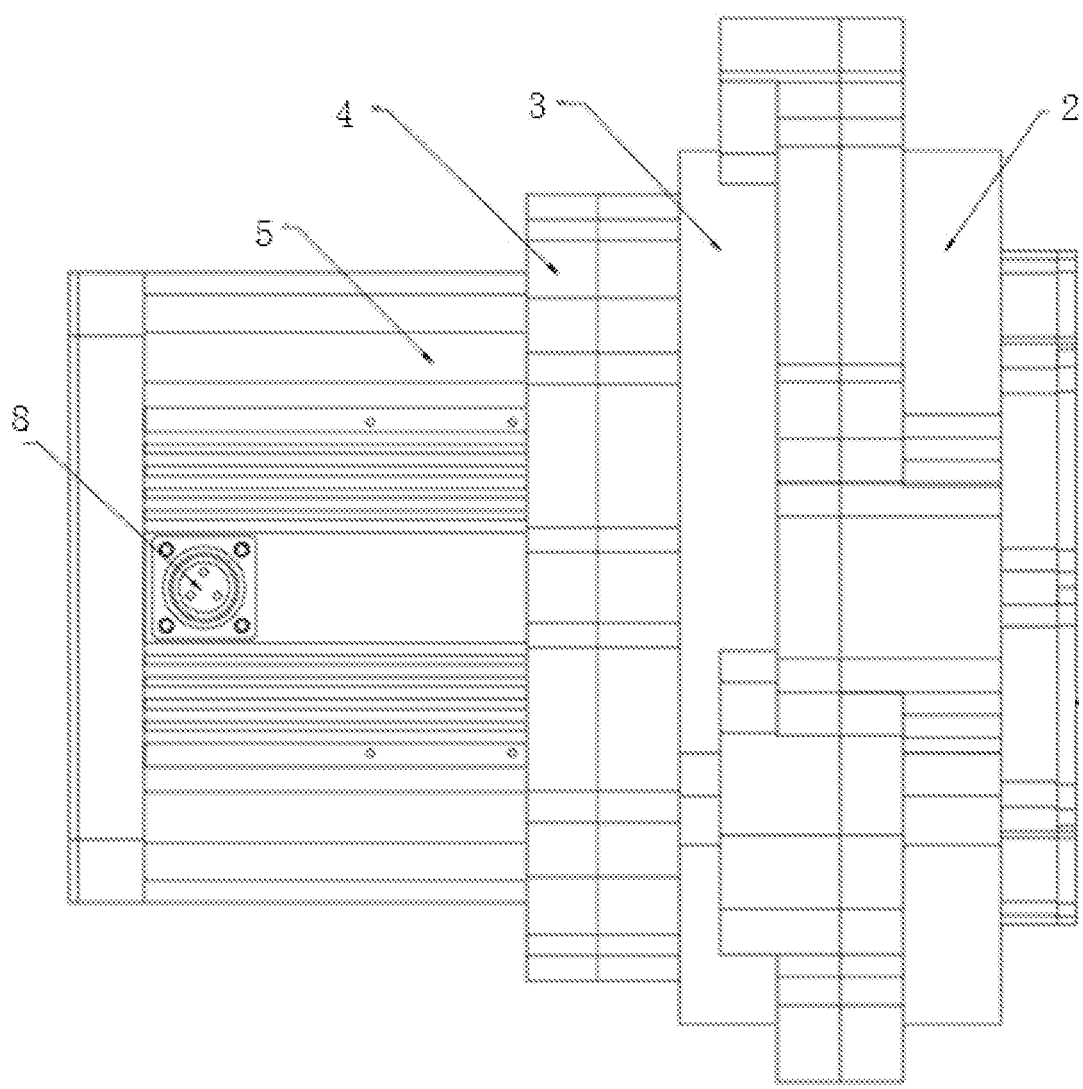
FIG. 1 shows an overall schematic diagram of a preferred embodiment of an oil-free scroll air compressor with double parallel grooves on both sides.

Lists of reference signs: 1—movable scroll with scroll wraps on both sides; 10—rotating bearing III; 11—scroll wraps III; 13—exhaust communication hole I; 14—rotating shaft mounting hole; 1101—crankshaft mounting hole I; 1102—crankshaft mounting hole II; 17—eccentric section; 171—movable scroll bearing; 2—fixed scroll I; 200—gas outlet passage; 210—gas inlet; 21—scroll wraps I; 22—cooling water chamber I; 221—water tank I; 222—water tank cover plate I; 223—water inlet passage I; 23—gas outlet passage inlet; 231—reinforcing rib; 24—crankshaft mounting hole IV; 25—gas compression channel I; 251—gas compression channel Ia; 252—gas compression channel Ib; 3—fixed scroll II; 31—scroll wraps II; 3101—crankshaft mounting hole III; 32—cooling water chamber II; 321—water tank II; 322—water tank cover plate II; 323—water inlet passage II; 34—rotating shaft avoiding hole; 35—gas compression channel II; 351—gas compression channel IIa; 352—gas compression channel IIb; 4—motor base; 5—casing; 6—end cover; 7—rotating shaft; 71—rotating bearing I; 72—rotating bearing II; 701—counter weight I; 702—counter weight II; 8—motor; 9—socket; 10—rotating bearing III.

DETAILED DESCRIPTION OF THE EMBODIMENTS

In order to make the objectives, technical solutions, and advantages of the present disclosure clearer, the present disclosure will be further described below in detail with reference to the accompanying drawings and embodiments. It should be appreciated that the specific embodiments described herein are only used to explain rather than limiting the present disclosure.

It should be appreciated that, in the description of the present disclosure, the orientational or positional relationships indicated by the terms "upper", "lower", "front" "rear", "inner", and "outer" are based on the orientational or positional relationships shown in the drawings, and they are indicated only for the convenience of describing the present disclosure and simplifying the description, rather than indicating or implying that a device or element being described must have a specific orientation, be constructed and operated in a specific orientation, and therefore cannot be interpreted as limitations to the present disclosure.

It should be noted that, in the description of the present disclosure, the terms "mount", "connect", and "connected" should be interpreted in a broad sense unless otherwise clearly specified and defined. For example, they may be used to indicate a fixed connection, a one-piece connection, or a detachable connection; or an internal communication between two elements; or a direct connection or an indirect connection realized through an intermediate medium. For those of ordinary skill in the art, specific meanings of the above terms in the present disclosure may be interpreted depending on specific context.

Figure 2:
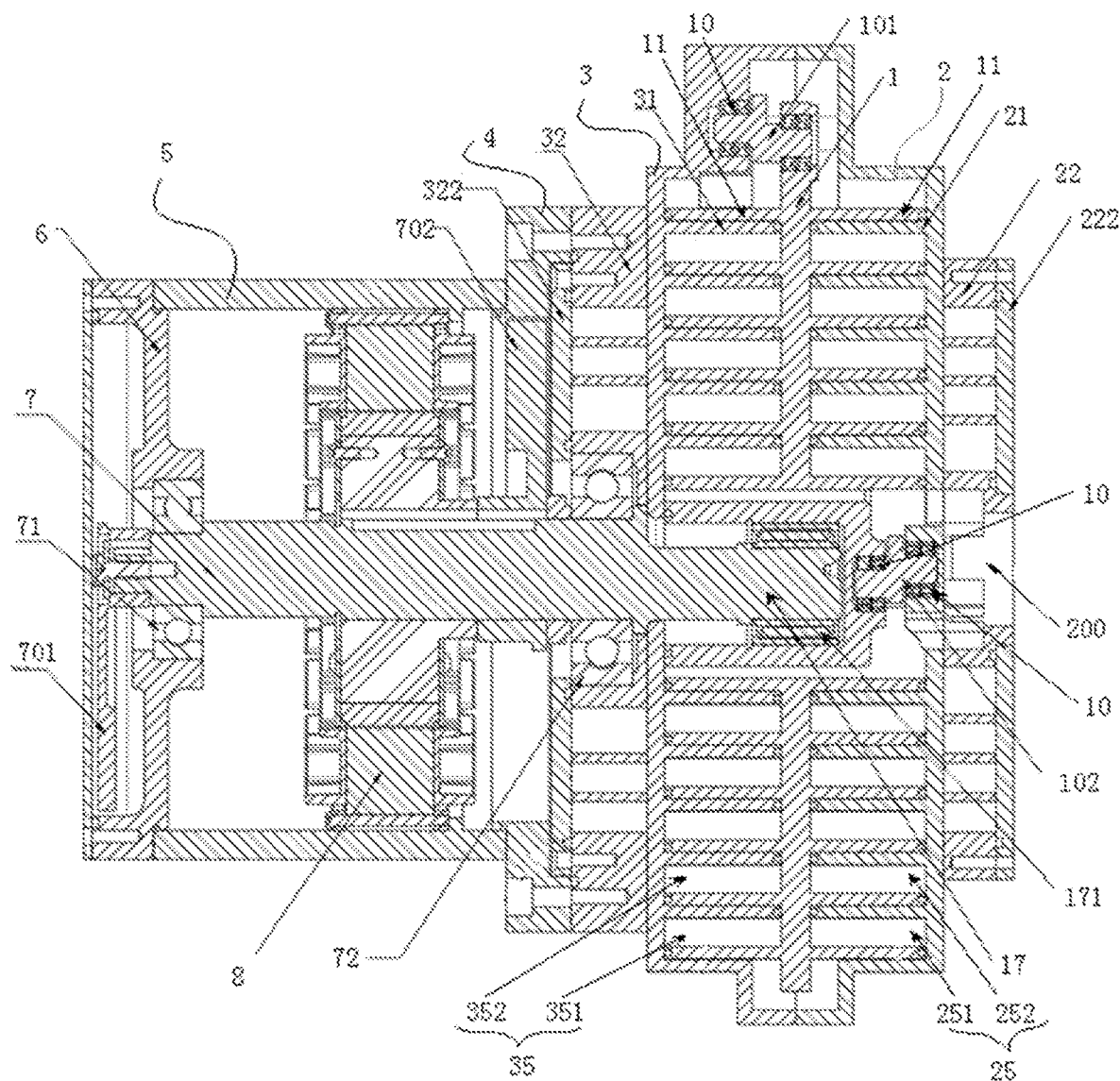
FIG. 2 shows a cross-sectional view of the scroll air compressor according to the embodiment.
Figure 3:
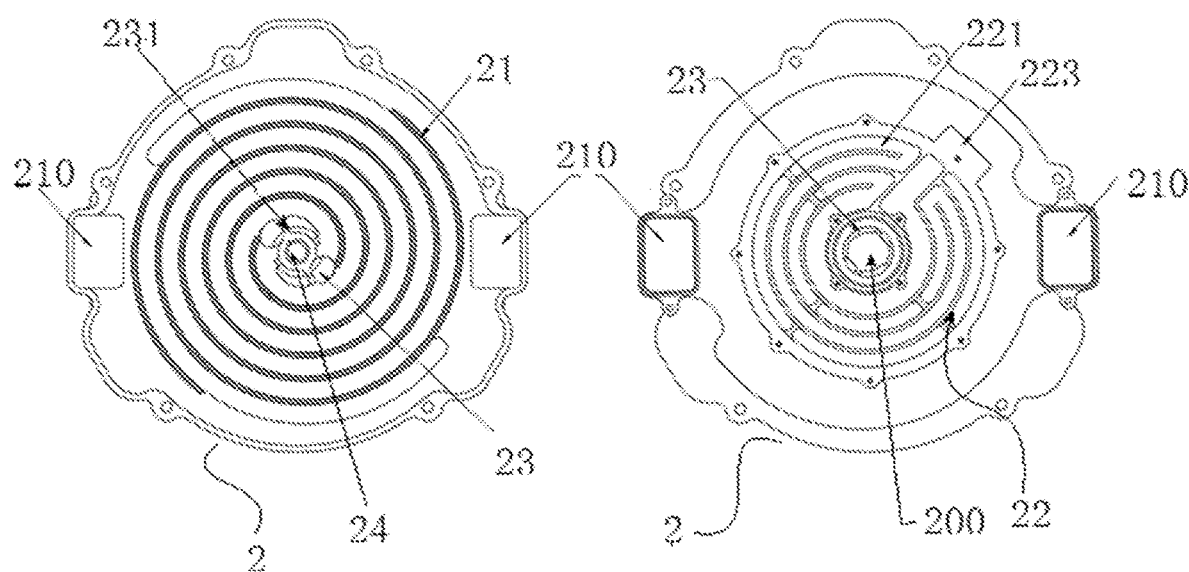
FIG. 3 is a schematic diagram of two end surfaces of a fixed scroll I according to the embodiment.

FIG. 1 and FIG. 2 show a preferred embodiment of the present disclosure. An oil-free scroll air compressor with double parallel grooves on both sides includes a casing 5, a fixed scroll I 2 on an end away from the casing 5, and a fixed scroll II 3 on an end close to the casing 5. A motor 8 is fixedly mounted in the casing 5, and may be driven by power supplied through a socket 9. In order to ensure stable operation of the motor, a motor base 4 is provided between the motor 8 and the fixed scroll II 3. The casing 5 is fixedly provided on an end thereof away from the motor base 4 with a detachable end cover 6. The fixed scroll 2 has a structure as shown in FIG. 3. The fixed scroll I 2 is provided on an end surface thereof with scroll wraps I 21, and is provided at the other end surface thereof with a cooling water chamber I 22.

Figure 4:
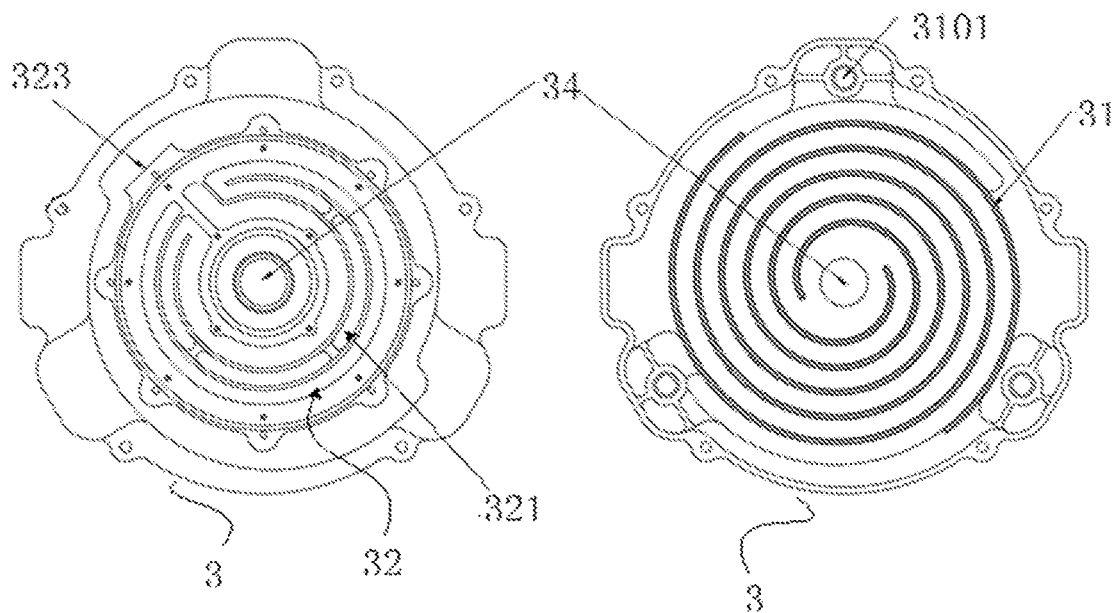
FIG. 4 is a schematic diagram of two end surfaces of a fixed scroll II according to the embodiment.

The cooling water chamber I 22 includes a water tank I 221, a water tank cover plate I 222, and a water inlet passage I 223. The water tank I 221 is fixedly provided on the end surface of the fixed scroll I 2 facing away from the scroll wraps I 21. The water tank cover plate 222 is detachably connected over the water tank I 221, and the water inlet passage I 223 is in communication with the water tank I 221. Similarly, the fixed scroll II 3 has a structure as shown in FIG. 2 and FIG. 4. The fixed scroll II 3 is provided, in a same way as in the case of the fixed scroll I 2, with scroll wraps II 31 and a cooling water chamber II 32.

Figure 5:
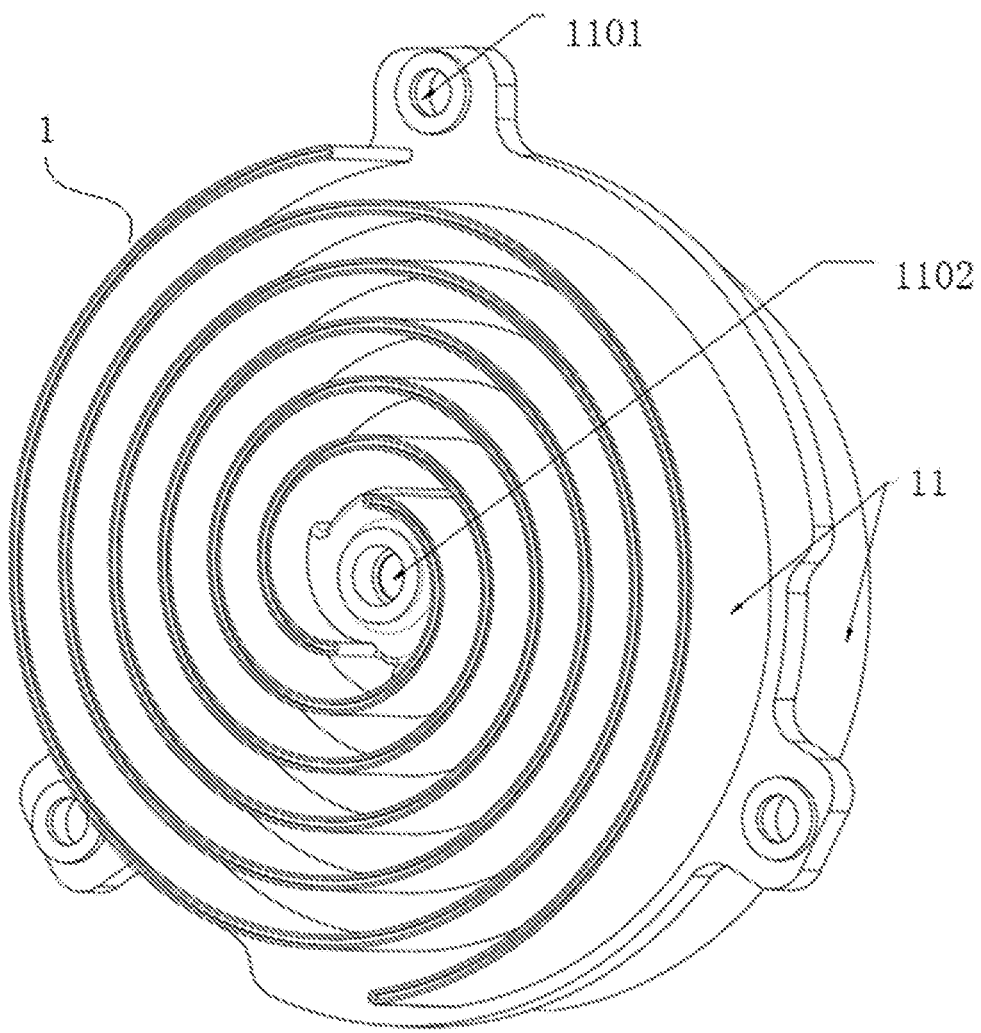
FIG. 5 is a schematic diagram of a movable scroll with scroll wraps on both sides according to the embodiment.
Figure 6:
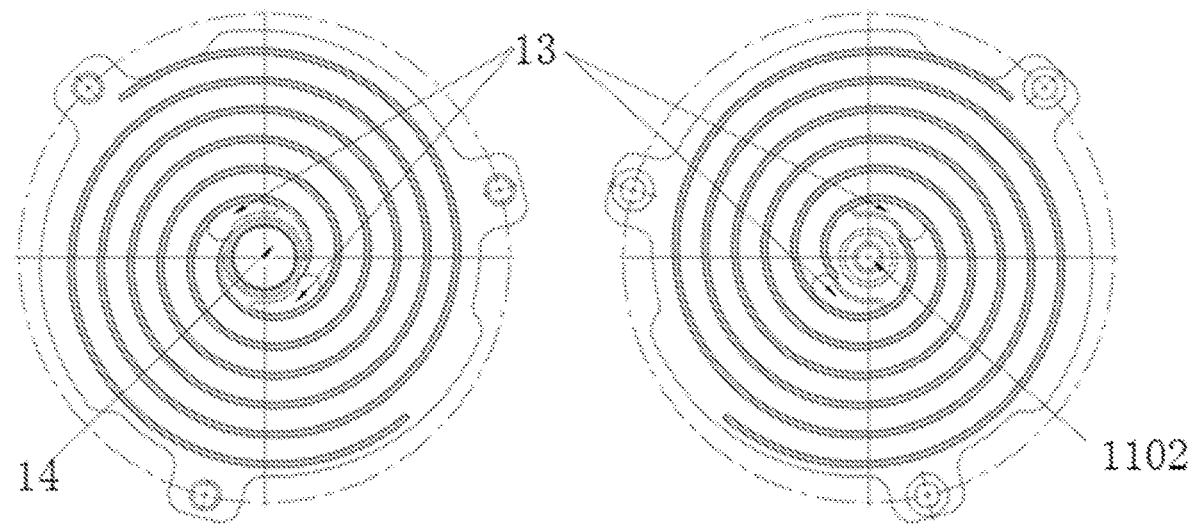
FIG. 6 is a schematic diagram of two end surfaces of the movable scroll with scroll wraps on both sides according to the embodiment.

The fixed scroll I 2 and the fixed scroll II 3 are fixedly connected to each other at positions on outer circumferences thereof, with end surfaces thereof where the scroll wraps are located facing each other. The fixed scroll I 2 and the fixed scroll II 3 are in communication with each other in outer circumferential directions thereof. The fixed scroll I 2 is provided in the outer circumferential direction thereof with at least two gas inlets 210 uniformly distributed along the circumferential direction. Further, a movable scroll 1 with scroll wraps on both sides is connected between the fixed scroll I 2 and the fixed scroll II 3. The movable scroll 1 with scroll wraps on both sides has a structure as shown in FIGS. 5 and 6. The movable scroll 1 with scroll wraps on both sides is provided on both end surfaces thereof with scroll wraps III 11. The scroll wraps III 11 on one end surface engage with the scroll wraps I 21 to form a gas compression channel I 25; and the scroll wraps III 11 on the other end surface engage with the scroll wraps II 31 to form a gas compression channel II 35. The gas compression channel I 25 and the gas compression channel II 35 both have a double-parallel-groove structure. A specific structure and formation of the double-parallel-groove structure are as follows.

Provided on respective end surfaces are two scroll wraps I 21, two scroll wraps II 31, and two scroll wraps III 11. The two scroll wraps on a same end surface extend, from two respective positions close to a center of the end surface and centrally symmetrical with respect to the center of the end surface, to an outer circumference of the end surface, along a same circumferential direction and in shapes of swirls; and two ends of the two scroll wraps on the outer circumference are also centrally symmetrical with respect to the center of the end surface. The two scroll wraps on the same end surface simultaneously extend in a clockwise or counter-clockwise direction, and the two scroll wraps together form two parallel and isolated spiral grooves. With the design of the double-parallel-groove structure, the gas compression channel I 25 is divided into gas compression channels Ia 251 and gas compression channels Ib 252 arranged at intervals, and the gas compression channel II 35 is divided into gas compression channels IIa 351 and gas compression channels IIb 352 arranged at intervals, by way of which a volume of air that can be compressed by the scroll air compressor per unit time and a total displacement of the scroll air compressor are increased.

The movable scroll 1 with scroll wraps on both sides is provided close to a center thereof with an exhaust communication hole I 13 communicating the gas compression channel I 25 with the gas compression channel II 35. The fixed scroll I 2 is provided at a center thereof with a gas outlet passage 200 communicating the gas compression channel I 25 with an outside. A high-pressure gas in the gas compression channel II 35 enters the gas compression channel I 25 through the exhaust communication hole I 13, is then mixed with a high-pressure gas in the gas compression channel I 25, and is finally discharged together with the high-pressure gas in the gas compression channel I 25. In particular, a shape and a position of a gas outlet passage inlet 23 of the gas outlet passage 200 are configured to correspond to those of the exhaust communication hole I 13, and a reinforcing rib 231 is provided in the gas outlet passage inlet 23. Configuring the gas outlet passage inlet 23 to correspond to the exhaust communication hole I 13 helps to improve flow stability of a gas to be discharged out of the scroll compressor, to thereby avoid a large difference in shapes between the exhaust communication hole I 13 and the gas outlet passage inlet 23 which can effect an aerodynamic parameter of the gas to be discharged and further effect a pressure of the gas to be discharged. The reinforcing rib 231 is used to enhance strength of the gas outlet passage inlet 23, to ensure that the gas outlet passage inlet 23 does not deform during continuous flowing of a high-pressure gas and adapts to large displacement working conditions.

Figure 7:
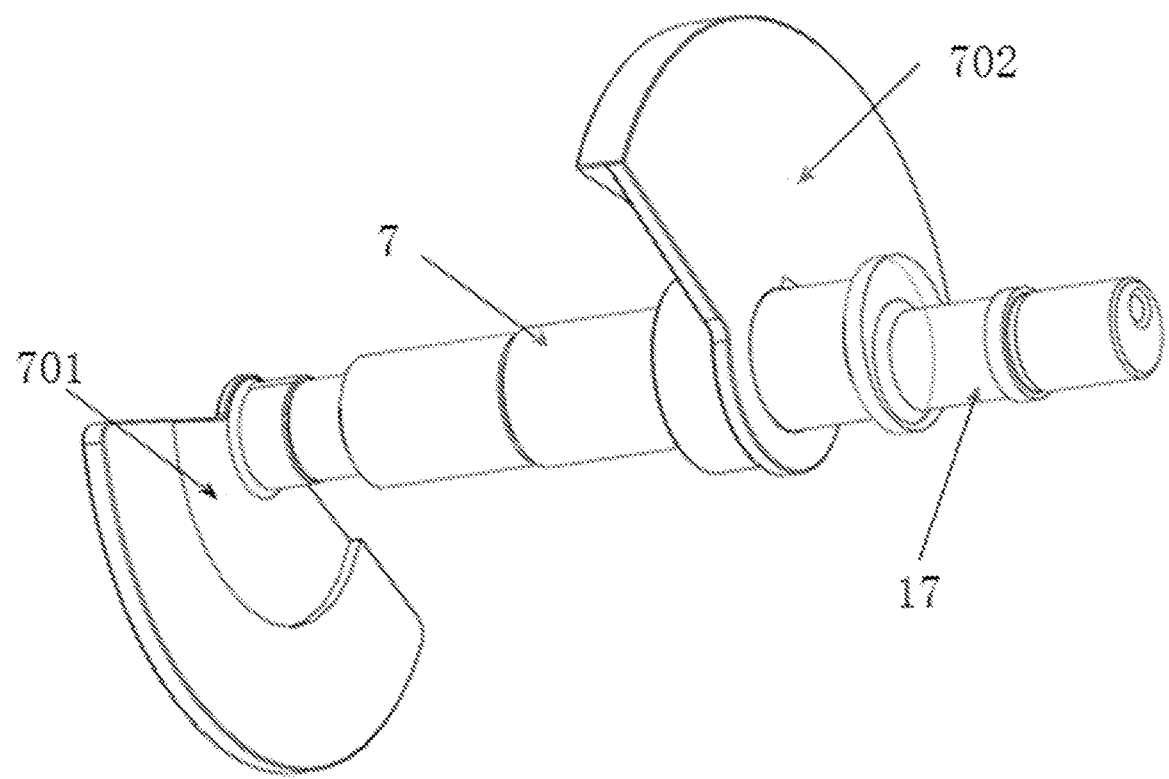
FIG. 7 is a schematic diagram of a rotating shaft according to the embodiment.

Referring to FIG. 7, the movable scroll 1 with scroll wraps on both sides is driven by a rotating shaft 7. The rotating shaft 7 is driven by the motor 8. The rotating shaft 7 includes an eccentric section 17 with a certain eccentricity that is mainly determined by a size of an involute curve of the scroll wraps. The eccentric section 17 passes through a rotating shaft avoiding hole 34 provided in a center of the fixed scroll II 3, and is fixedly connected in a rotating shaft mounting hole 14 in the center of the movable scroll 1 with scroll wraps on both sides. Driven by the rotating shaft 7, the movable scroll 1 with scroll wraps on both sides is capable of a translational movement in a circular direction around an axis of the rotating shaft 7. During the movement, the scroll wraps III 11 compresses and divides the gas compression channel into a plurality of individually airtight compression chambers, and gradually compresses a gas in each of the compression chambers towards the center of the end surface. During the compression process, a volume of the compressed chamber is gradually reduced, by way of which compression of the gas is completed. In order to balance an inertia moment produced by the eccentric section 17, the rotating shaft 7 is also provided thereon with counter weights, which are a counter weight I 701 on an end thereof away from the eccentric section 17, and a counter weight II 702 on an end thereof close to the eccentric section 17. To avoid mutual interference between the rotating shaft 7 and the scroll air compressor during rotation of the counter weights, a cavity for accommodating the counter weights is provided in the scroll air compressor. Further, in order to prevent easy deviation of the axis of the rotating shaft 7 when the rotating shaft 7 rotates, in this embodiment, a rotating bearing I 71 is connected between the rotating shaft 7 and the end cover 6, and a rotating bearing II 72 is provided between the rotating shaft 7 and the fixed scroll II 3. The rotating bearing I 71 and the rotating bearing II 72 together limit the rotating shaft 7 to ensure that a position of the axis of the rotating shaft 7 does not deviate during the rotation. This avoids shaft body swinging of the rotating shaft 7 due to inertia generated when the rotating shaft 7 rotates, which can further affect a movement trajectory of the movable scroll 1 with scroll wraps on both sides. This can also reduce friction loss at a connecting position of the rotating shaft 7 and prolong service life of the rotating shaft 7.

Figure 8:
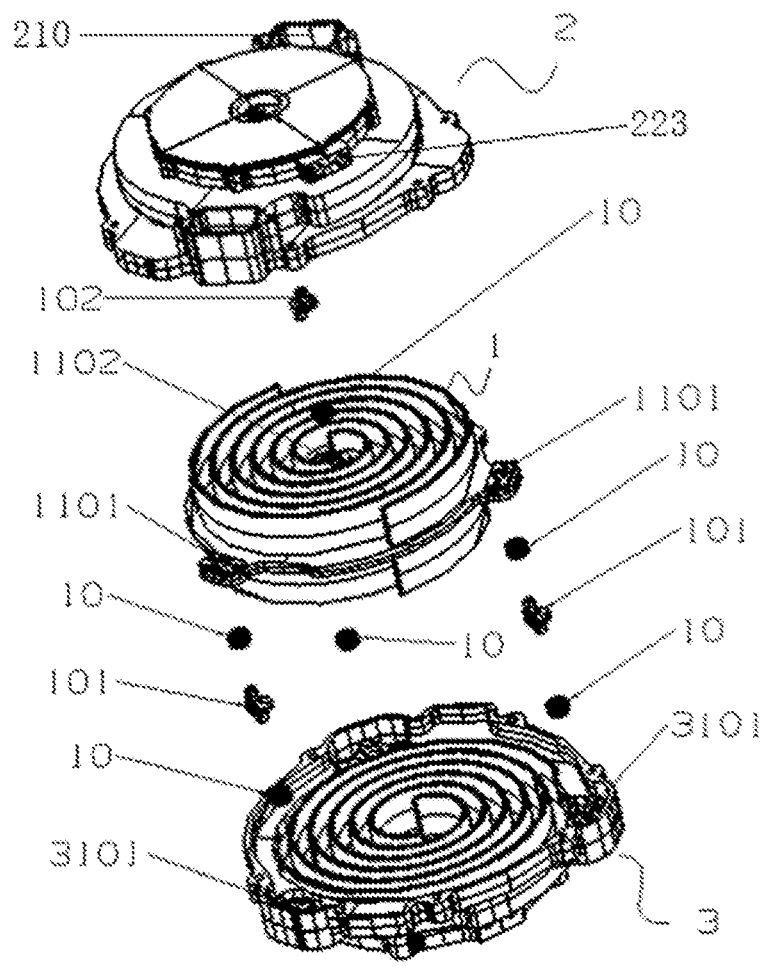
FIG. 8 is a schematic diagram showing assembly of crankshafts.
Figure 9:
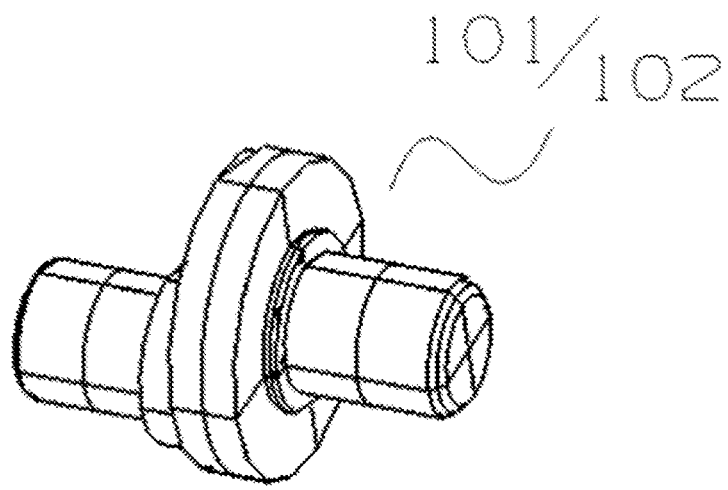
FIG. 9 is a schematic diagram of the crankshafts.

As shown in FIG. 8 and FIG. 9, in order to ensure that a trajectory of the circular translational movement of the movable scroll 1 with scroll wraps on both sides is always maintained at a predetermined position, eccentric guide mechanisms are provided between the movable scroll 1 with scroll wraps on both sides and the fixed scrolls. A preferred embodiment of the eccentric guide mechanisms is as follows. The fixed scroll II 3 is provided on the outer circumference thereof with at least two crankshaft mounting holes III 3101 evenly distributed along the circumferential direction, and the movable scroll 1 with scroll wraps on both sides is provided on the outer circumference thereof with crankshaft mounting holes I 1101 corresponding to the crankshaft mounting holes III 3101. The movable scroll 1 with scroll wraps on both sides is provided at a center of the end surface thereof facing the fixed scroll I 2 with a crankshaft mounting hole II 1102, and the fixed scroll I 2 is provided at the center thereof with a crankshaft mounting hole IV 24 corresponding to the crankshaft mounting hole II 1102. Crankshafts I 101 are fixedly connected between the crankshaft mounting holes I 1101 and the crankshaft mounting holes III 3101. A second crankshaft II 102 is fixedly connected between the crankshaft mounting hole 1102 and the crankshaft mounting hole IV 24. Eccentricities of the crankshafts I 101 and the crankshaft II 102 are the same as that of the eccentric section 17. Dimensions of the crankshafts I 101 and the crankshaft II 102 are also configured completely the same to facilitate manufacturing thereof. When the movable scroll 1 with scroll wraps on both sides is driven by the rotating shaft 7 to perform a circular translational movement, the crankshafts I 101 and the crankshaft II 102 can limit the range of movement of the movable scroll 1 with scroll wraps on both sides, which ensures that the movable scroll 1 with scroll wraps on both sides does not deviate from a working position, and meanwhile helps to enhance working stability of the scroll air compressor. The crankshafts I 101 and the crankshaft II 102 can also share a force from rotating inertia of the movable scroll 1 with scroll wraps on both sides exerted on the rotating shaft 7, to thereby increase service life of the rotating shaft 7. Rotating bearings III 10 may be further arranged between the crankshafts I 101 and the crankshaft I 102 and the mounting holes to ensure that the crankshafts do not deviate due to severe wear.

In order to meet requirements of different working conditions, the motor 8 may also be configured as a variable frequency motor. When being used, the variable frequency motor may adjust a rotating speed of the rotating shaft 7, to thereby adjust the displacement of the scroll air compressor. Aluminum alloy, as a common material, can satisfy requirements for strength of the scroll wraps, and the cost thereof is relatively low.

The following is a brief description of a working process of the scroll air compressor.

After the motor 8 is started, the rotating shaft 7 drives, through the eccentric section 17, the movable scroll 1 with scroll wraps on both sides to make a circular translational movement. The scroll wraps III 11 compress the scroll wraps I 21 and the scroll wraps II 31 and divide the gas compression channel I 25 and the gas compression channel II 35 into a plurality of different compression chambers. The compression chambers, due to compression from the moving scroll wraps III, are gradually moved to center positions of the end surfaces. During the movement, volumes of the compression chambers gradually decrease and pressures of gases in the compression chambers gradually increase. After the gas in the compression chamber is compressed to a position of the exhaust communication hole I 13, the high-pressure gas flows into the gas compression channel I 25 through the exhaust communication hole I 13, and is mixed with the high-pressure gas in the gas compression channel I 25 which is compressed in the same way. The mixed gases are then discharged into the gas outlet passage 200 through the gas outlet passage inlet 23, and finally discharged out of the scroll air compressor. When a part of the gases in the gas compression channels is discharged, pressures in the fixed scrolls decrease, an external gas flows into the fixed scroll I 2 and the fixed scroll II 3 through the gas inlets 210 under the action of the pressures, and a next cycle of compression work is continued.

The above described is merely preferred embodiments of the present disclosure, and is not intended to limit the present disclosure. Any modifications, equivalent replacement, and improvement made within the spirit and principle of the present disclosure shall be included in the protection scope of the present disclosure.

The invention claimed is:

1. An oil-free scroll air compressor with double parallel grooves on both sides, comprising:
   a casing (5);
   a motor (8), which is fixedly connected in the casing (5);
   a rotating shaft (7), which is movably connected in the casing (5) and is driven by the motor (8);
   wherein:
   the oil-free scroll air compressor further comprises two fixed scrolls, which are a fixed scroll I (2) on an end away from the casing (5), and a fixed scroll II (3) on an end close to the casing (5) and fixedly connected to the casing (5), wherein the fixed scroll I (2) and the fixed scroll II (3) are fixedly connected to each other in a sealed way on outer circumferences thereof;
   the fixed scroll I (2) is provided on the outer circumference thereof with at least two gas inlets (210) evenly arranged along a circumferential direction, and the fixed scroll I (2) and the fixed scroll II (3) are in communication with each other at a position close to a connecting surface therebetween;
   the fixed scroll I (2) is provided on an end surface thereof facing the fixed scroll II (3) with scroll wraps I (21), and the fixed scroll II (3) is provided on an end surface thereof facing the scroll wraps I (21) with scroll wraps II (31), wherein the scroll wraps I (21) and the scroll wraps II (31) have a same size; a movable scroll (1) with scroll wraps on both sides is connected between the fixed scroll I (2) and the fixed scroll II (3), wherein the movable scroll (1) with scroll wraps on both sides is provided at both end surfaces thereof with scroll wraps III (11), the scroll wraps III (11) being adapted to the scroll wraps I (21) and the scroll wraps II (31) respectively; the scroll wraps I (21), the scroll wraps II (31), and the scroll wraps III (11) are configured as double-parallel-groove structures which are specifically as follows: the scroll wraps on each of the end surfaces comprise two scroll wraps, wherein the two scroll wraps are configured to simultaneously extend, from two respective positions close to a center of the end surface and centrally symmetrical with respect to the center of the end surface, to an outer circumference of the end surface, in a clockwise or counterclockwise direction and in shapes of swirls;
   the scroll wraps I (21) and the scroll wraps III (11) mesh with each other to form a gas compression channel I (25), and the scroll wraps II (31) and the scroll wraps III (11) mesh with each other to form a gas compression channel II (35); the double-parallel-groove structure divides the gas compression channel I (25) into gas compression channels Ia (251) and gas compression channels Ib (252) arranged at intervals, and the double-parallel-groove structure divides the gas compression channel II (35) into gas compression channels IIa (351) and gas compression channels IIb (352);

the movable scroll (1) with scroll wraps on both sides is provided at a position close to a center thereof with an exhaust communication hole I (13) communicating the gas compression channel I (25) with the gas compression channel II (35), and the fixed scroll I (2) is provided at a central position thereof with a gas outlet passage (200) communicating an outside with the gas compression channel I (25);

the fixed scroll II (3) is provided at a central position thereof with a rotating shaft avoiding hole (34);

the rotating shaft (7) comprises an eccentric section (17) having an axis deviated from an axis of the rotating shaft (7); the movable scroll (1) with scroll wraps on both sides is provided at a central position of a side thereof facing the fixed scroll II (3) with a rotating shaft mounting hole (14); the eccentric section (17) passes through the rotating shaft avoiding hole (34) and is fixedly connected in the rotating shaft mounting hole (14), and the eccentric section (17) drives the movable scroll (1) with scroll wraps on both sides to make a circular translational movement around the axis of the rotating shaft (7); and eccentric positioning mechanisms are provided between the movable scroll (1) with scroll wraps on both sides and the fixed scroll I (21), and between the movable scroll (1) with scroll wraps on both sides and the fixed scroll II (3);

wherein: the eccentric positioning mechanisms comprise crankshafts having same eccentricities as an eccentricity of the eccentric section (17), and the movable scroll (1) with scroll wraps on both sides, the fixed scroll I (2), and the fixed scroll II (3) are all provided thereon with crankshaft mounting holes adapted to the crankshafts;

wherein: the crankshaft mounting holes comprise: at least two crankshaft mounting holes I (1101) evenly distributed along an outer circumferential surface of the movable scroll (1) with scroll wraps on both sides; crankshaft mounting holes III (3101) provided on an outer circumferential surface of the fixed scroll II (3) and corresponding to the crankshaft mounting holes I (1101); a crankshaft mounting hole II (1102) provided at a central position of an end surface of the movable scroll (1) with scroll wraps on both sides facing away from the shaft mounting hole (14); and a crankshaft mounting hole IV (24) provided on the fixed scroll I (2) and corresponding to the crankshaft mounting hole II (1102);

the crankshafts comprise crankshafts I (101) and a crankshaft II (102), wherein the crankshafts I (101) are fixedly connected between the crankshaft mounting holes I (1101) and the crankshaft mounting holes III (3101), and the crankshaft II (102) is fixedly connected between the crankshaft mounting hole II (1102) and the crankshaft mounting hole IV (24).

2. The scroll air compressor according to claim 1, wherein: the fixed scroll I (2) and the fixed scroll II (3) are provided on end surfaces thereof facing away from the movable scroll (1) with scroll wraps on both sides with cooling mechanisms, the cooling mechanisms being a cooling water chamber I (22) corresponding to the fixed scroll I (2) and a cooling water chamber II (32) corresponding to the fixed scroll II (3); the cooling water chamber I (22) comprises a water tank I (221) fixedly connected to the fixed scroll I (2), a water inlet passage I (223) in communication with the water tank I (221), and a water tank cover plate I (222) covered and mounted on the water tank I (221); the cooling water chamber II (32) is provided, in a same way as in the case of the cooling water chamber I (22), with a water inlet passage II (323), a water tank II (321), and a water tank cover plate II (322).

3. The scroll air compressor according to claim 2, wherein: rotating bearings III (10) are provided between the crankshafts and the crankshaft mounting holes.

4. The scroll air compressor according to claim 1, wherein: the gas outlet passage (200) comprises a gas outlet passage inlet (23) in a same shape as the exhaust communication hole I (13), wherein the gas outlet passage inlet (23) is provided therein with a reinforcing rib (231) for enhancing strength of the gas outlet passage inlet (23).

5. The scroll air compressor according to claim 1, wherein the scroll air compressor is made of an aluminum alloy.

6. The scroll air compressor according to claim 1, wherein the motor (8) is a variable frequency motor.

7. The scroll air compressor according to claim 1, wherein: an end of the casing (5) away from the fixed scroll II (3) is connected in a sealed manner with a detachable end cover (6); an end of the rotating shaft (7) is fixedly connected to the end cover (6) through a rotating bearing I (71), and another end of the rotating shaft (7) is connected to the fixed scroll II (3) through a rotating bearing II (72); and the eccentric section (17) is fixedly connected to the rotating shaft mounting hole (14) through a movable scroll bearing (171).

8. The scroll air compressor according to claim 7, wherein: rotating bearings III (10) are provided between the crankshafts and the crankshaft mounting holes.

9. The scroll air compressor according to claim 1, wherein: the rotating shaft (7) is provided thereon with at least two counter weights extending outward from the rotating shaft (7), which are a counter weight I (701) on an end away from the eccentric section (17) and a counter weight II (702) on an end close to the eccentric section (17), wherein an extension direction of the counter weight I (701) and an extension direction of the counter weight II (702) differ by 180° relative to the axis of the rotating shaft (7); and the scroll air compressor is provided therein with a cavity for accommodating the counter weight I (701) and the counter weight II (702).

10. The scroll air compressor according to claim 9, wherein: rotating bearings III (10) are provided between the crankshafts and the crankshaft mounting holes.

11. The scroll air compressor according to claim 1, wherein: rotating bearings III (10) are provided between the crankshafts and the crankshaft mounting holes.

\* \* \* \* \*